（12) United States Patent
Yin et al.

(10) Patent No.: US 9,438,779 B2
(45) Date of Patent: Sep. 6, 2016

(54) WIDE-ANGLE CAMERA USING ACHROMATIC DOUBLET PRISM ARRAY AND METHOD OF MANUFACTURING THE SAME

(71) Applicant: OmniVision Technologies, Inc., Santa Clara, CA (US)

(72) Inventors: Chuen-Yi Yin, New Taipei (TW); Jau-Jan Deng, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/616,936

(22) Filed: Feb. 9, 2015

(65) Prior Publication Data

US 2016/0234411 A1   Aug. 11, 2016

(51) Int. Cl.
*H04N 5/225* (2006.01)
*G02B 13/10* (2006.01)
*G02B 3/00* (2006.01)
*G02B 13/00* (2006.01)
*G02B 5/04* (2006.01)

(52) U.S. Cl.
CPC .......... *H04N 5/2254* (2013.01); *G02B 3/0056* (2013.01); *G02B 5/045* (2013.01); *G02B 13/0085* (2013.01); *G02B 13/10* (2013.01); *H04N 5/2258* (2013.01)

(58) Field of Classification Search
CPC ........... G02B 13/001–13/009; G02B 13/0055; G02B 13/006; G02B 13/0065; G02B 13/0085; G02B 13/06; G02B 13/10; G02B 3/0006; G02B 3/0037; G02B 3/005; G02B 3/0056; G02B 5/04; G02B 5/045; G02B 7/18; G02B 7/1805; H04N 5/2251; H04N 5/2253; H04N 5/2254; H04N 5/2257; H04N 5/2258

See application file for complete search history.

(56) References Cited

U.S. PATENT DOCUMENTS

| 4,518,231 | A | * | 5/1985 | Muchel | G02B 21/22 359/377 |
| 2006/0215054 | A1 | | 9/2006 | Liang et al. | |
| 2007/0242946 | A1 | * | 10/2007 | Toyoda | G02B 13/06 396/322 |
| 2009/0263121 | A1 | * | 10/2009 | Imahori | G02B 7/025 396/529 |
| 2011/0170849 | A1 | * | 7/2011 | Chang | G03B 17/02 396/322 |

OTHER PUBLICATIONS

U.S. Appl. No. 11/087,304, filed Mar. 23, 2005 to Aug. 3, 2010, 312 pp.

* cited by examiner

*Primary Examiner* — Paul Berardesca
(74) *Attorney, Agent, or Firm* — Lathrop & Gage LLP

(57) ABSTRACT

A wide-angle camera and fabrication method thereof includes a sensor with a plurality of pixel sub-arrays and an array of optical elements on a first side of a substrate. Each of the optical elements is capable of forming an image from a field of view onto a different one of the pixel sub-arrays. The wide-angle camera also includes an array of achromatic doublet prisms on a second side of the substrate, where each of the achromatic doublet prisms is aligned to provide a viewing angle with a different one of the optical elements. The sensor captures a wide-angle field of view while having a compact format.

9 Claims, 14 Drawing Sheets

WIDE-ANGLE CAMERA USING ACHROMATIC DOUBLET PRISM ARRAY AND METHOD OF MANUFACTURING THE SAME

RELATED APPLICATIONS

This application is related to co-filed patent application Ser. No. 14/616,925 titled "Wide-Angle Camera Using Achromatic Doublet Prism Array and Method of Manufacturing the Same".

BACKGROUND

There are several ways to capture a wide-angle image; one of them is based on N×N lens array system that provides compact and small size camera module as compared to a more conventional camera module that uses a single lens. The lens array technique uses a prism and other optical components to form an optical system with increased viewing angle. However, the use of the prism causes severe chromatic aberration that lowers the modulation transfer function (MTF) of the optical system significantly and thereby reduces resultant image quality.

SUMMARY OF THE INVENTION

Optical systems and manufacturing methods thereof disclose a prism-based optical system with reduced chromatic aberration. Based upon wafer-level fabrication, a novel achromatic doublet prism array has two asymmetric prisms that improve optical resolution while not unduly complicating the wafer-level fabrication process. As used herein, the term "two asymmetric prisms" means that the shape of the first prism to the second prism is asymmetric. That is, those two prisms are inversely bonded to each other. The concept of asymmetry is discussed in greater detail below.

In one embodiment, a wide-angle camera has a sensor with a plurality of pixel sub-arrays and an array of optical elements on a first side of a substrate where each of the optical elements is capable of forming an image from a field of view onto a different one of the pixel sub-arrays. The wide-angle camera also includes an array of achromatic doublet prisms on a second side of the substrate, where each of the achromatic doublet prisms is aligned to provide a viewing angle with a different one of the optical elements, such that the sensor captures a wide-angle field of view while having a compact format.

In another embodiment, in a compact format wide-angle camera of the type having an array of optical elements and a corresponding array of single prisms that cooperate to capture a wide field-of-view, where the array of optical elements is formed on a first side of a substrate and the array of single prisms is formed on a second side of the substrate, and each of the single prisms is aligned with a different one of the optical elements and causes chromatic aberration, the improvement includes implementing the array of single prisms as an array of achromatic doublet prisms formed using wafer-level fabrication onto the second side of the substrate such that each achromatic doublet prism is aligned with a different one of the optical elements, the array of achromatic doublet prisms and the array of optical elements cooperating to capture the wide field-of-view with reduced chromatic aberration.

In another embodiment, a method of manufacturing an achromatic doublet prism array having a N×N number of sections, includes: forming an array of first prisms each located in one of the N×N sections, composed of a first material, onto a substrate; and, forming an array of second prisms each located in one of the N×N sections, composed of a second material different than the first material, atop the array of first prisms.

DETAILED DESCRIPTION OF THE EMBODIMENTS

Figure 1:
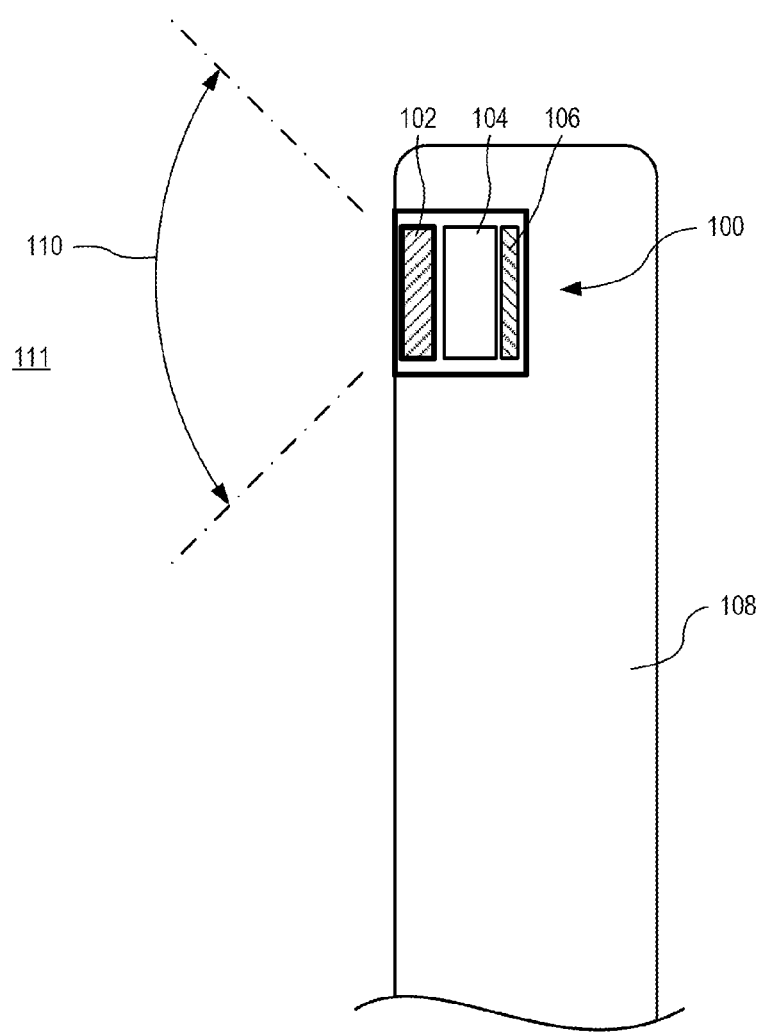
FIG. 1 shows one exemplary wide-angle camera using an achromatic doublet prism array, in an embodiment.
Figure 2:
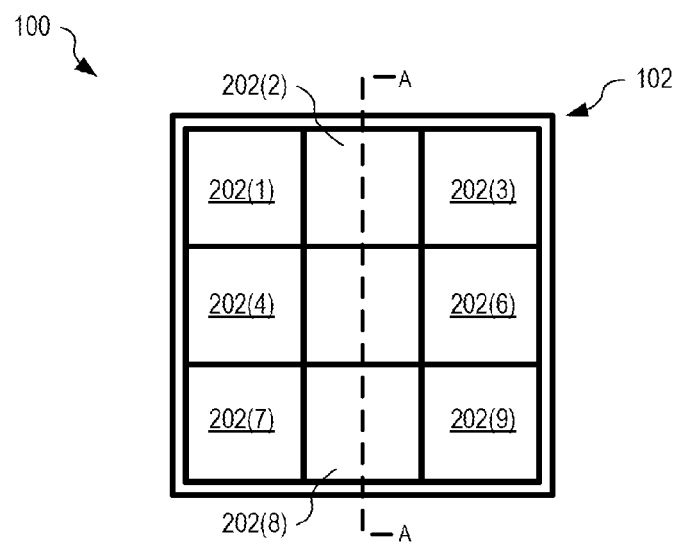
FIG. 2 shows a front view of the camera of FIG. 1 illustrating the achromatic doublet prism array with nine elements in a three-by-three array, in an embodiment.

FIG. 1 shows a side cross-section of one exemplary wide-angle camera 100 using an achromatic doublet prism array 102. FIG. 2 shows a front view of camera 100 illustrating achromatic doublet prism array 102 with nine achromatic doublet prisms 202(1)-(9) in a three-by-three array. Camera 100 is shown within a device 108 selected from the group including a smart phone, a personal camera, a wearable camera, and so on. Camera 100 is suitable for any application that requires a compact image capture device with a wide-angle field of view. Camera 100 also includes a lens array 104 and a sensor array 106. Lens array 104 and achromatic doublet prism array 102 facilitate capture of a wide-angle 110 field of view 111 by camera 100.

Figure 3:
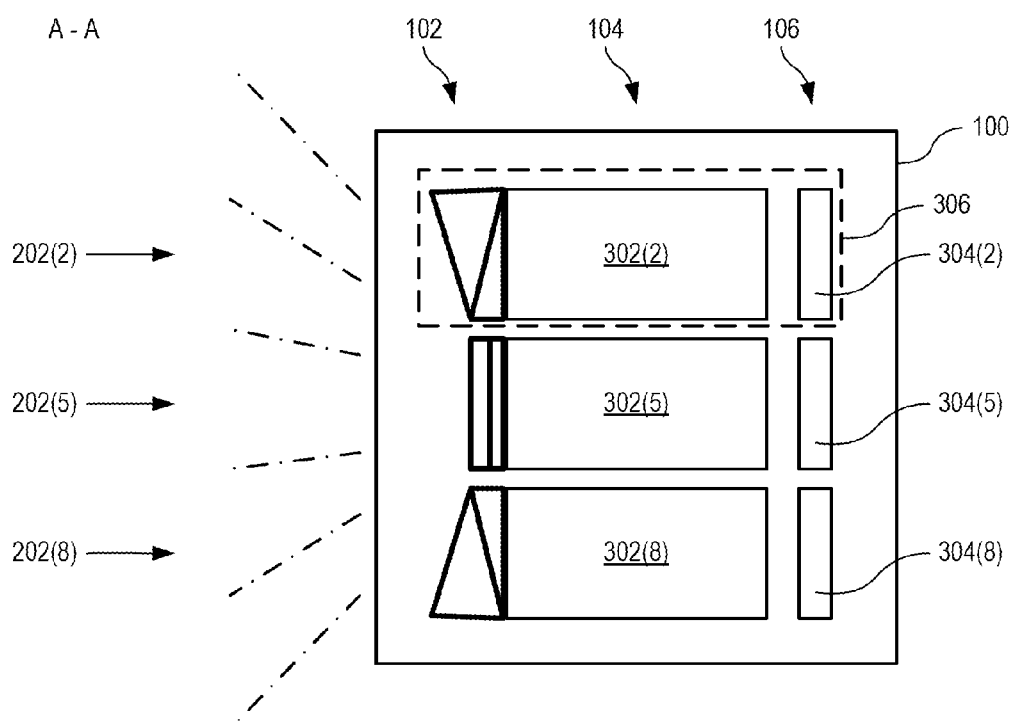
FIG. 3 is a side cross section A-A through the camera of FIGS. 1 and 2 illustrating three exemplary sub-cameras, in an embodiment.

FIG. 3 is a side cross section A-A through camera 100 illustrating three exemplary achromatic doublet prisms 202 (2), 202(5), and 202(8), corresponding optical elements 302(2), 302(5), and 302(8), and corresponding pixel sub-arrays 304(2), 304(5), and 304(8), respectively. Each achromatic doublet prism 202, corresponding optical element 302, and corresponding pixel sub-array 304 forms a sub-camera 306, where camera 100 has nine such sub-cameras. In the example of FIG. 3, sub-camera 306 includes achromatic doublet prism 202(2), corresponding optical element 302(2), and corresponding pixel sub-array 304(2).

Figure 4:
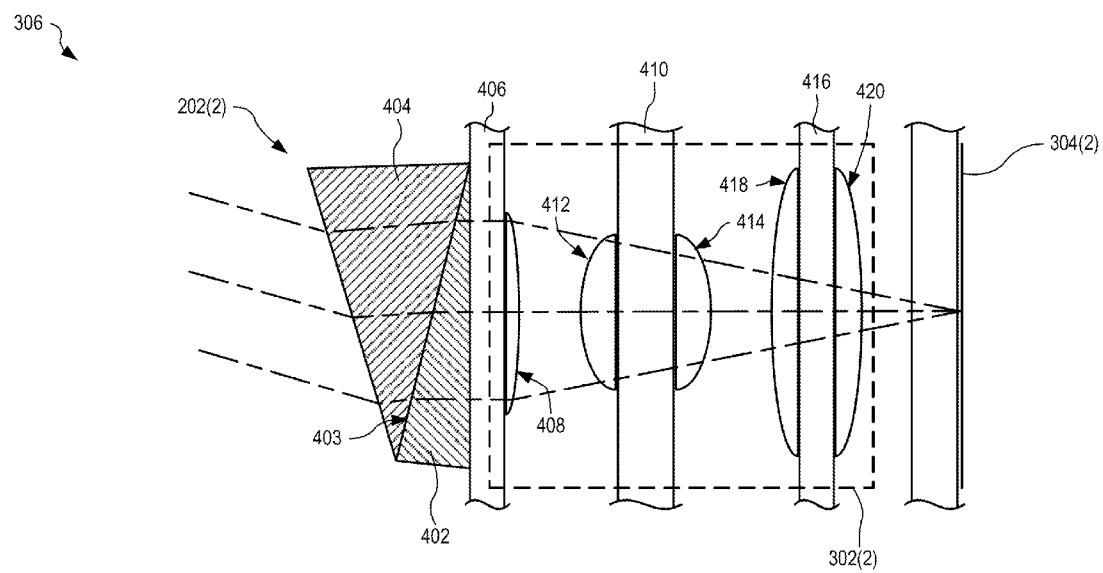
FIG. 4 shows the sub-camera of FIG. 3 in further exemplary detail, in an embodiment.

FIG. 4 shows sub-camera 306 of FIG. 3 in further exemplary detail. Optical element 302(2) is a five surface wafer-level lens structure having a first substrate 406 with a first lens 408, a second substrate 410 with a second lens 412 and a third lens 414, and a third substrate 416 with a fourth lens 418 and a fifth lens 420. Substrates 406, 410, and 416 are for example glass. Although lenses 408, 412, 414, 418, and 420 are shown in this example, other optical elements with more or fewer lenses, or lenses of different types, may be used without departing from the scope hereof.

Each achromatic doublet prism 202 is formed of two asymmetric prisms. Achromatic doublet prism 202(2) has a first prism 402 having a low Abbe number (V1) and high refractive index (n1), and a second prism 404 having a high Abbe number (V2) and a low refractive index (n2). For example, in FIG. 4, first prism 402 has an angle, refractive index (n1) and an Abbe number (V1) of 13.6 degrees, 1.6, and 30, respectively; whereas second prism 404 has an angle, refractive index (n2), and Abbe number (V2) of −17.2 degrees, 1.5, and 57, respectively. It should be appreciated that these values may vary without departing from the scope hereof. Achromatic doublet prism 202(2) functions to modify the viewing angle of optical element 302(2) and sub-camera 306. Configuration of each achromatic doublet prism 202 is selected to alter the viewing angle of the corresponding sub-camera 306 such that camera 100 captures wide-angle 110 field of view 111. Achromatic doublet prism 202(2) is formed directly onto a surface, opposite lens 408, of first substrate 406, as is discussed in further detail below, thereby reducing manufacturing time and cost. Further, the use of achromatic doublet prism 202 significantly improves the optical resolution of camera 100 such that it is comparable in quality to cameras formed without a prism.

To achieve a compact camera with wide-angle capability, an achromatic doublet prism having two asymmetric prisms made from two different optical materials with different Abbe numbers is used. The Abbe number of the first prism is lower that the Abbe number of the second prism. These prisms are formed combined on a first substrate using wafer-level fabrication, for example using method 1300 as discussed in further detail below. Geometry of each of each achromatic doublet prism is based upon its position within the array.

Assume the Abbe number of first prism is V1, and the Abbe number of second prism is V2, the refractive index of the first prism is n1, and the refractive index second prism is n2. If the following two constraints are satisfied, high optical performance is achieved for each sub-camera 306 (i.e., achromatic doublet prism 202(2) and optical element 302(2)).

Constraint 1: V2>V1, V2>50 and V1<35 (d line, wavelength is 587 nm).

Constraint 2: n2<n1, n2<1.52 and n1>1.58 (d line, wavelength is 587 nm).

The angle of combination surface 403 between first prism 402 and second prism 404 depends upon the matching of the refractive index of different materials of first prism 402 and second prism 404. For example, the respective angles of first prism 402 and second prism 404 may be different than 13.6 and −17.2 degrees as illustrated in FIG. 4, but the angle of first prism 402 is preferably negative compared to the angle of second prism 404.

Figure 5:
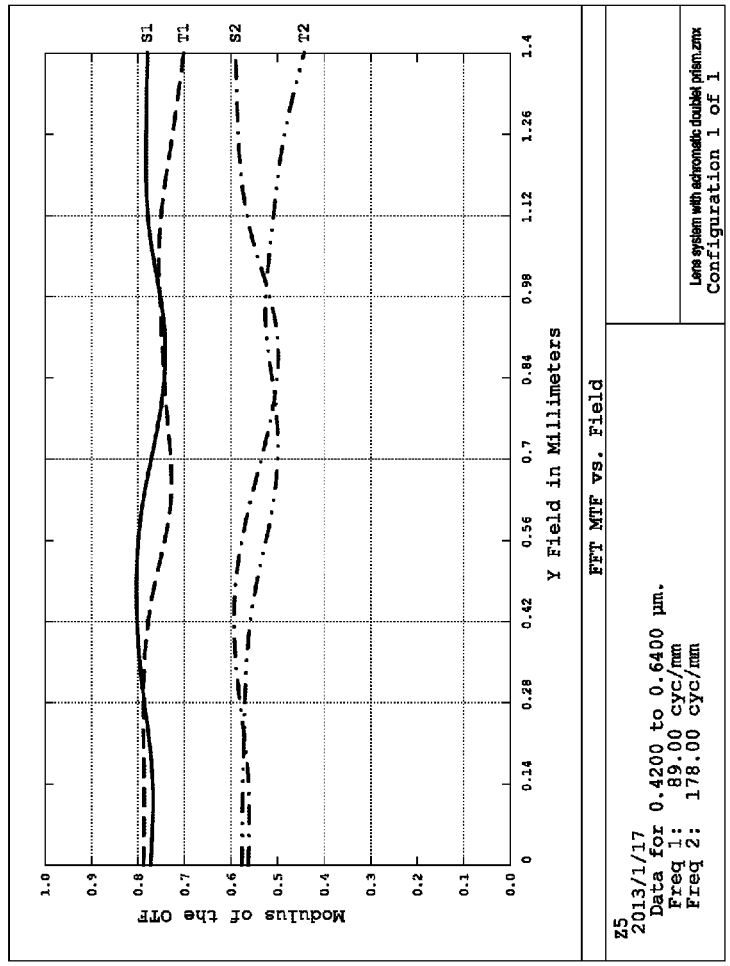
FIG. 5 shows an MTF through field graph illustrating exemplary optical performance of the sub-camera of FIGS. 3 and 4, in an embodiment.
Figure 6:
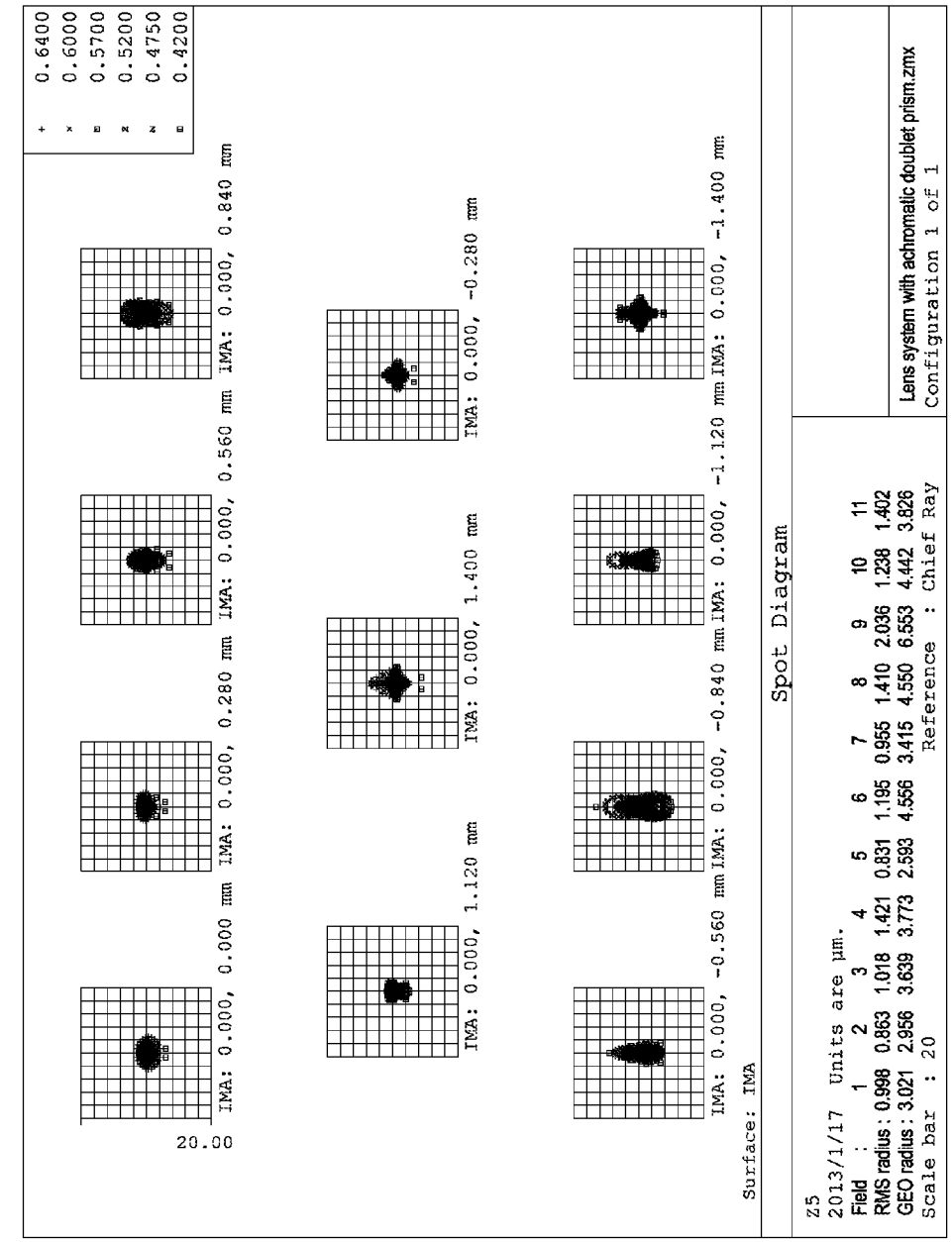
FIG. 6 shows a spot diagram generated by simulation of the sub-camera of FIGS. 3 and 4 when configured as described for FIG. 5, in an embodiment.

FIG. 5 shows an MTF through field graph 500 illustrating exemplary optical performance of sub-camera 306 (i.e., achromatic doublet prism 202(2) and optical element 302 (2)) of FIGS. 3 and 4. First prism 402 has an Abbe number (V1) of 30 and material of first prism 402 has a refractive index (n1) of 1.6 (d line, at 587 nm). Second prism 404 has an Abbe number (V2) of 57 and is made of a material with a refractive index (n2) of 1.51 (d line, at 587 nm). FIG. 6 shows a spot diagram 600 generated by simulation of sub-camera 306 (i.e., achromatic doublet prism 202(2) and optical element 302(2)) of FIGS. 3 and 4 when configured as described for FIG. 5.

For comparison, exemplary prior art optical configurations are tested and compared with MTF through field graph 500 and spot diagram 600 of achromatic doublet prism 202(2) and optical element 302(2) of FIGS. 3 and 4.

Figure 7:
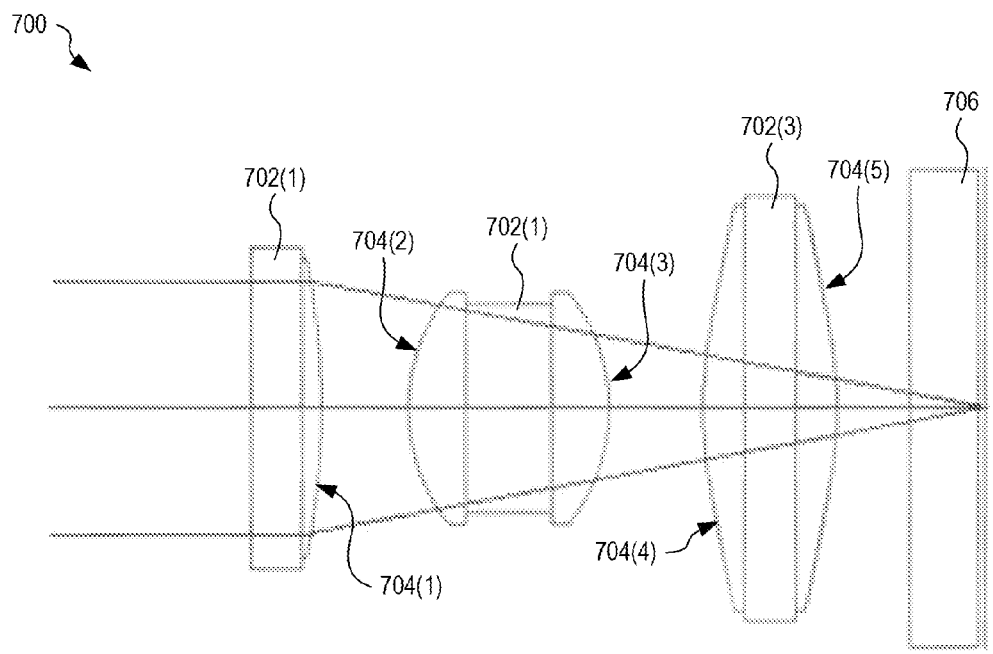
FIG. 7 shows one prior art wafer-level lens that has three substrates and five surfaces forming an image on a sensor array.

FIG. 7 shows one prior art wafer-level lens 700 that has three substrates 702(1)-(3) and five surfaces 704(1)-(5) forming an image on a sensor array 706. Wafer-level lens 700 is similar to optical element 302(2) of FIG. 3. Of note, wafer-level lens 700 does not include any prism and therefore does not have wide field-of-view capability.

Figure 8:
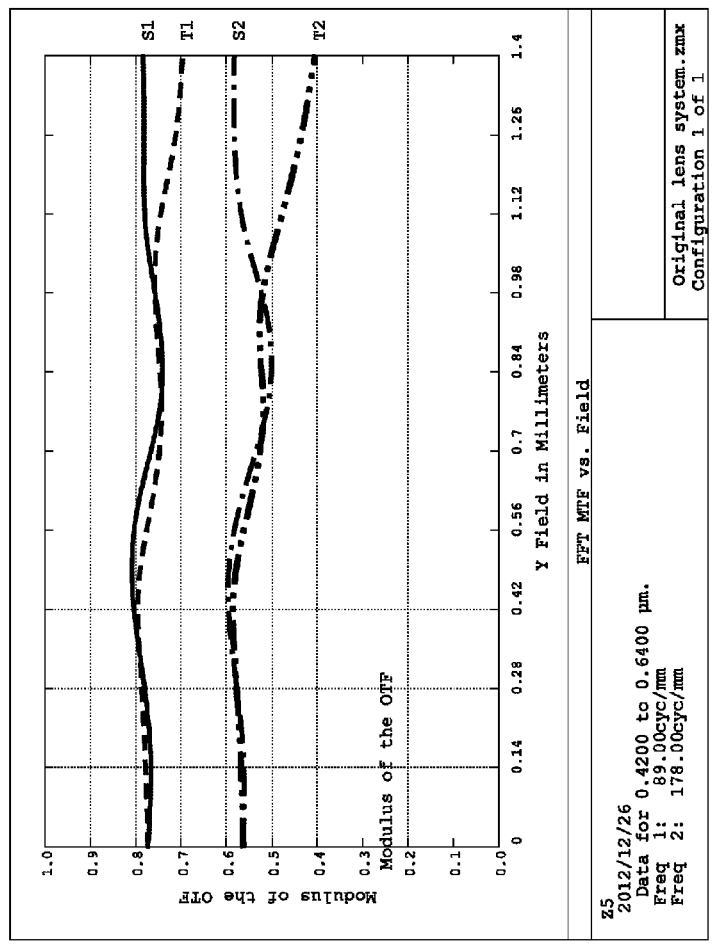
FIG. 8 is an MTF through field graph illustrating optical performance of the prior art wafer-level lens of FIG. 7.
Figure 9:
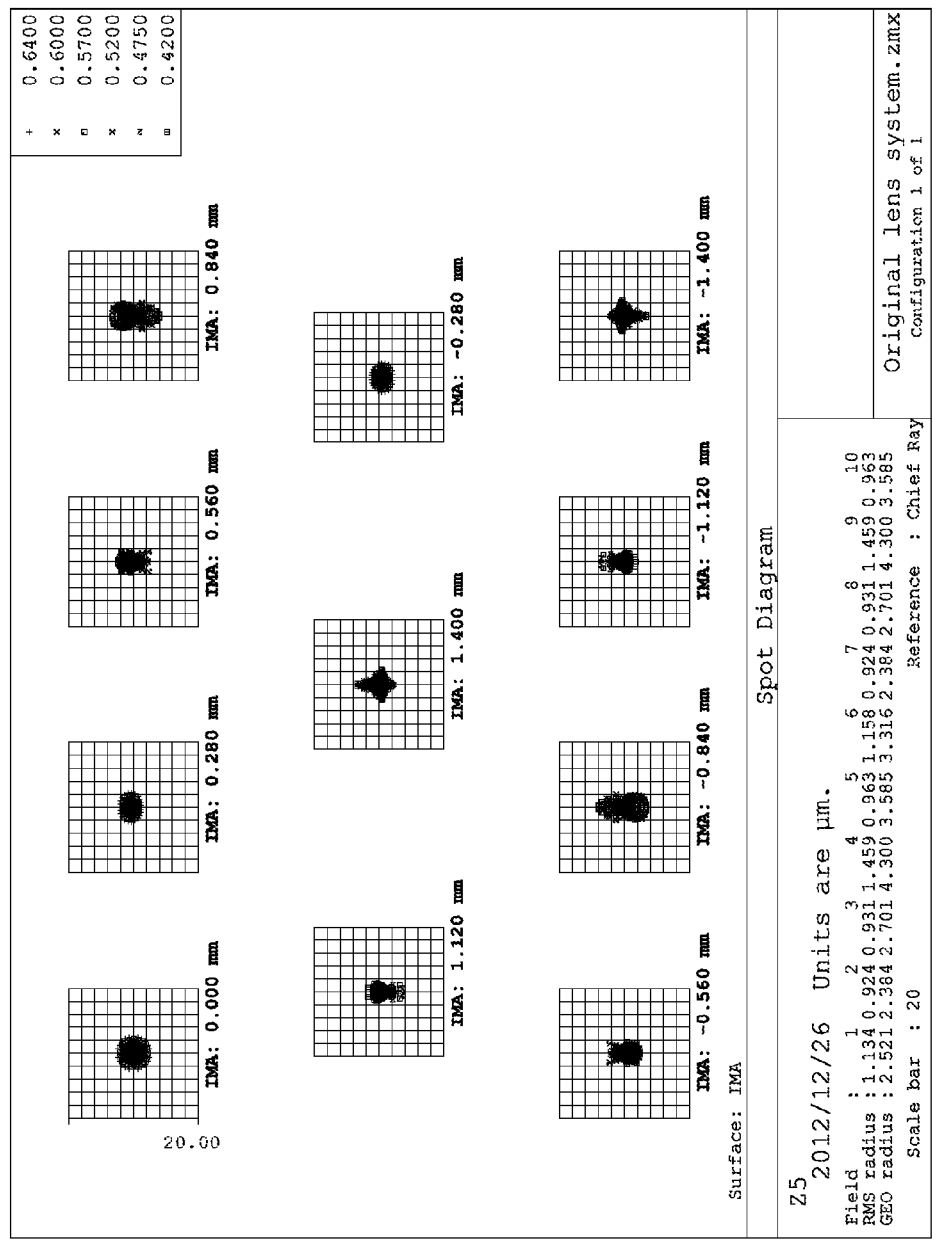
FIG. 9 is a spot diagram illustrating optical performance of the wafer-level lens of FIG. 7.

FIG. 8 is an MTF through field graph 800 illustrating optical performance of prior art wafer-level lens 700 of FIG. 7. FIG. 9 is a spot diagram 900 illustrating optical performance of wafer-level lens 700 of FIG. 7. MTF through field graph 800 and spot diagram 900 illustrate typical performance of wafer-level lens 700.

Figure 10:
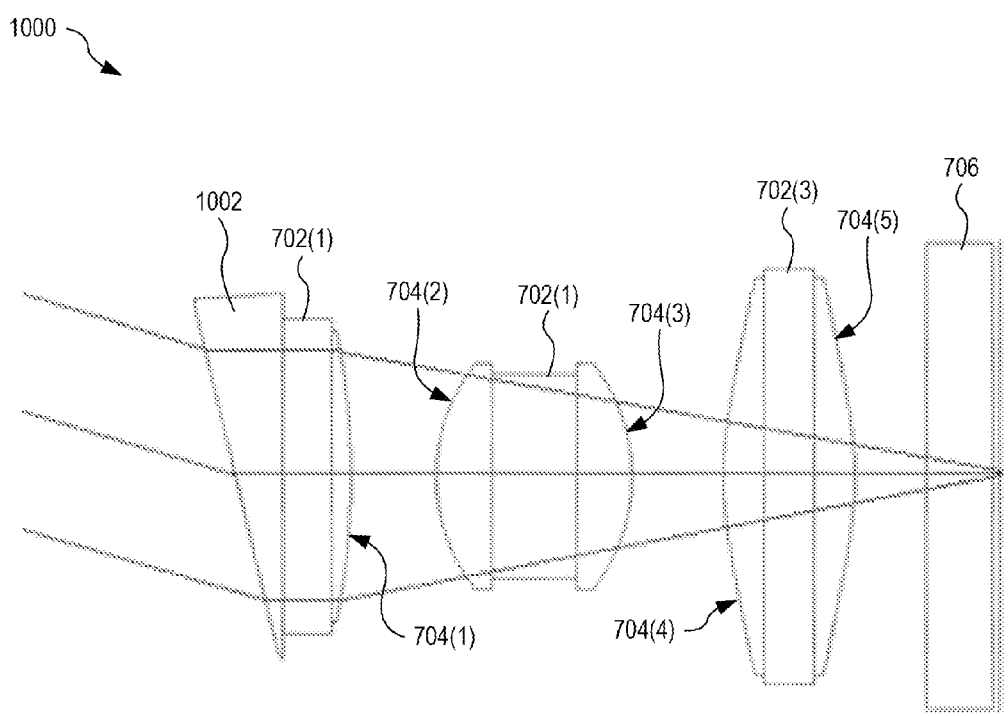
FIG. 10 shows another prior art wafer-level lens that is similar to the wafer-level lens of FIG. 7 but includes a single prism.

FIG. 10 shows another prior art wafer-level lens 1000 that is similar to wafer-level lens 700 of FIG. 7 but has an added single prism 1002 configured with a surface of substrate 702(1) opposite surface 704(1). Single prism 1002 has an Abbe number ($V_D$) of 62.6, and is made from a material with a refractive index (n) of 1.5168 (d line, at 587 nm). Of note, single prism 1002 provides wide angle capability to wafer-level lens 1000.

Figure 11:
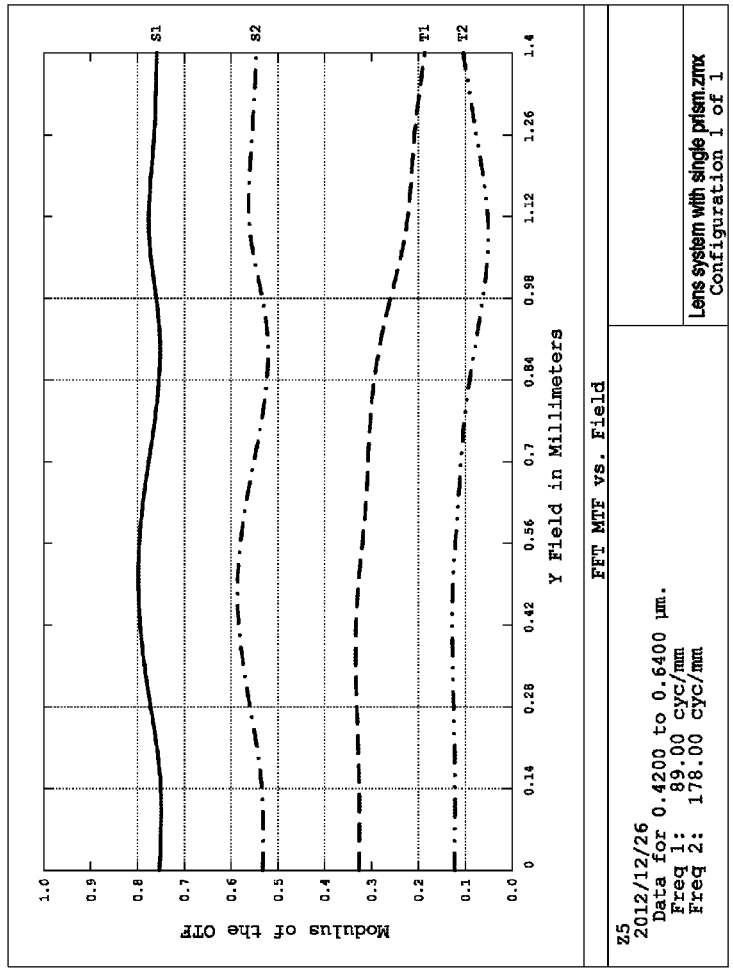
FIG. 11 is an MTF through field graph illustrating optical performance of the prior art wafer-level lens of FIG. 10.
Figure 12:
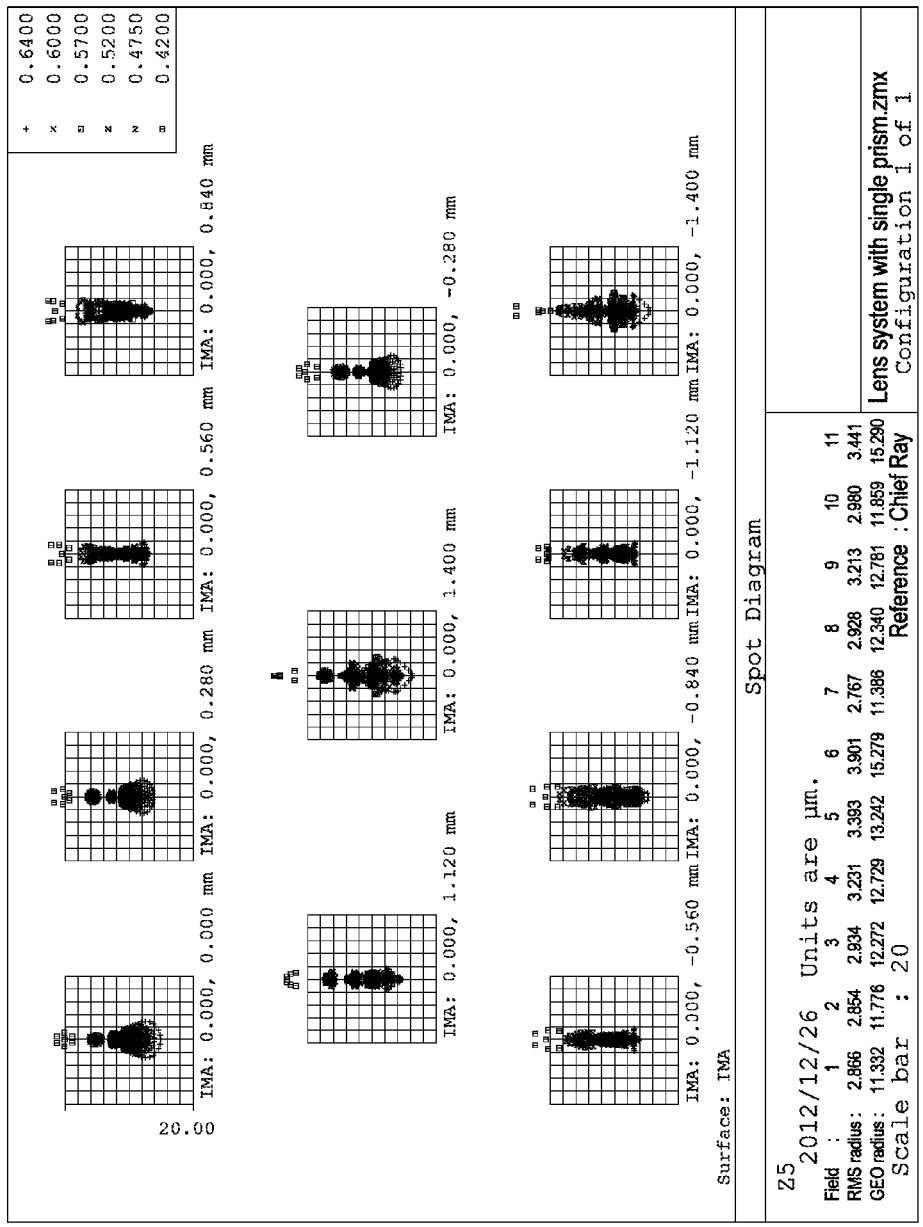
FIG. 12 is a spot diagram illustrating optical performance of the wafer-level lens of FIG. 10.

FIG. 11 is an MTF through field graph 1100 illustrating optical performance of prior art wafer-level lens 1000 of FIG. 10. FIG. 12 is a spot diagram 1200 illustrating optical performance of wafer-level lens 1000 of FIG. 10. MTF through field graph 800 and spot diagram 900 illustrate typical performance of wafer-level lens 700. As shown in graph 1100 and diagram 1200, the addition of single prism 1002 results in severe chromatic aberration that significantly lowers the optical resolving capability of wafer-level lens 1000 as shown in FIGS. 11 and 12 as compared to FIGS. 8 and 9. Thus, using a single prism, as shown in wafer-level lens 1000 results in a poor quality images.

However, comparing MTF through field graph 500, FIG. 5, and spot diagram 600, FIG. 6, with prior art MTF through field graph 800 (FIG. 8) and spot diagram 900 (FIG. 9) clearly shows that use of achromatic doublet prism 202 in sub-camera 306 of FIG. 3 results in a significant improvement in optical performance over prior art wafer-level lens 1000 of FIG. 10.

Figure 13:
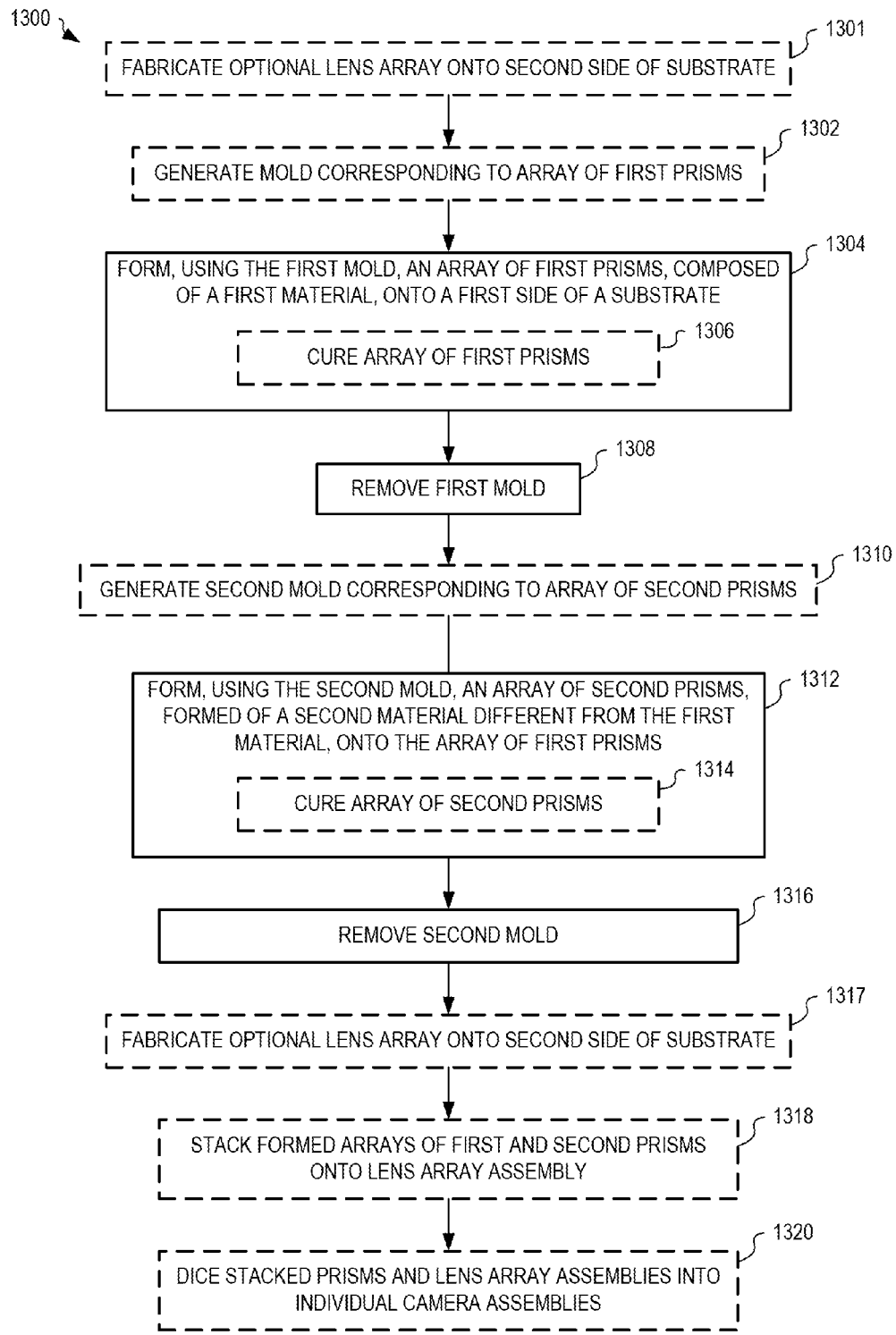
FIG. 13 is a flowchart illustrating one exemplary method for fabricating a wide-angle camera with an achromatic doublet prism array.
Figure 14:
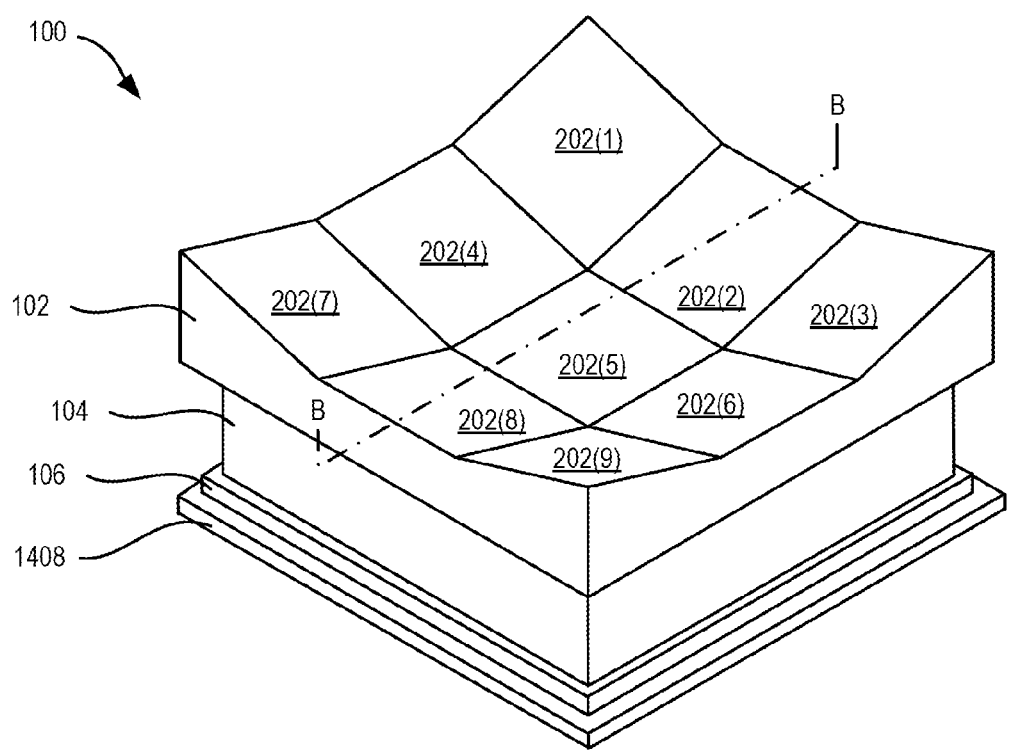
FIG. 14 depicts a perspective view of an exemplary camera assembly, including an array of achromatic doublet prisms stacked on lens array assembly, imaging sensor array, and imaging substrate, in one embodiment.
Figure 15A:
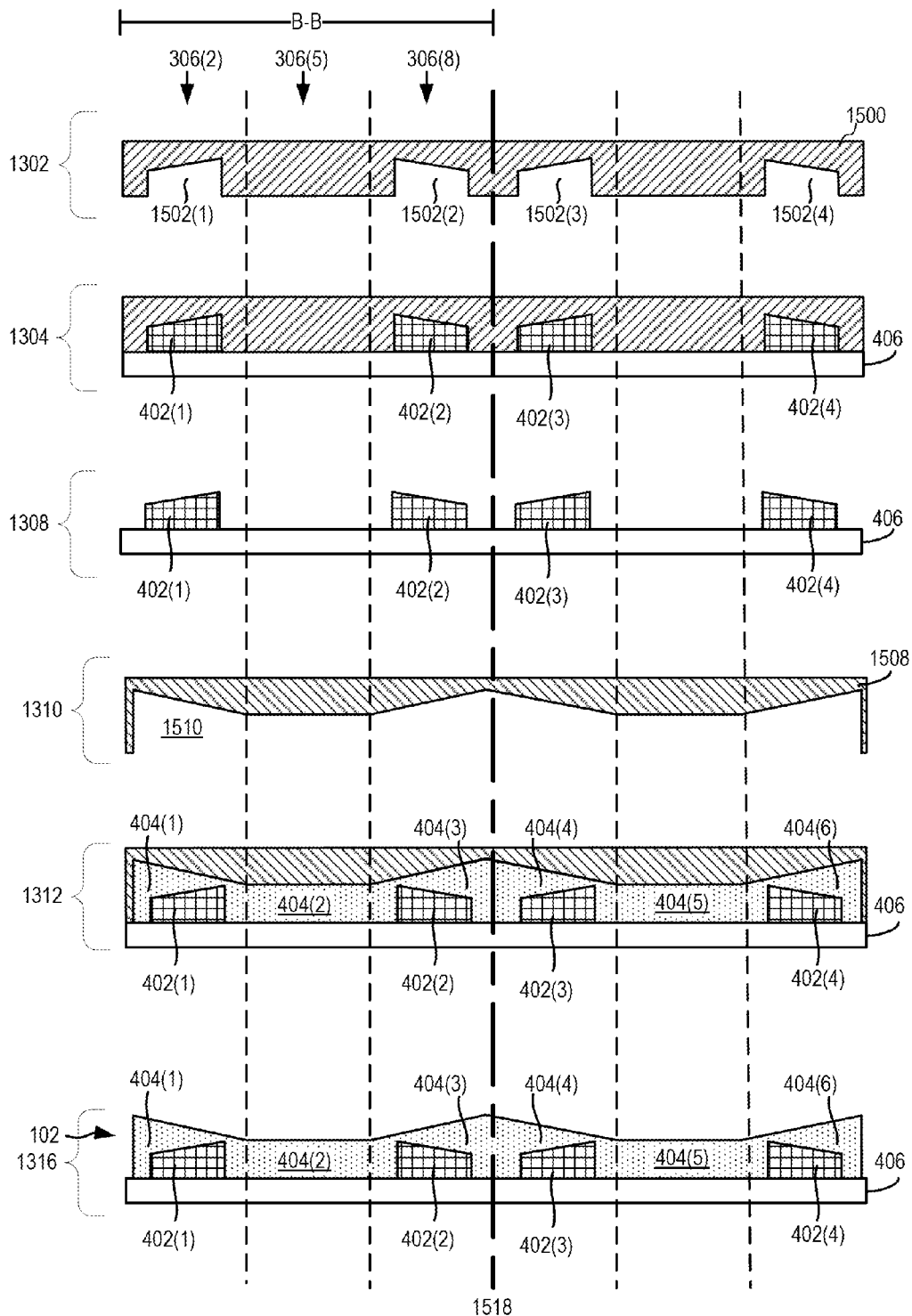
FIGS. 15A-C are cross sectional schematic diagrams illustrating the steps of the method of FIG. 13.
Figure 15B:
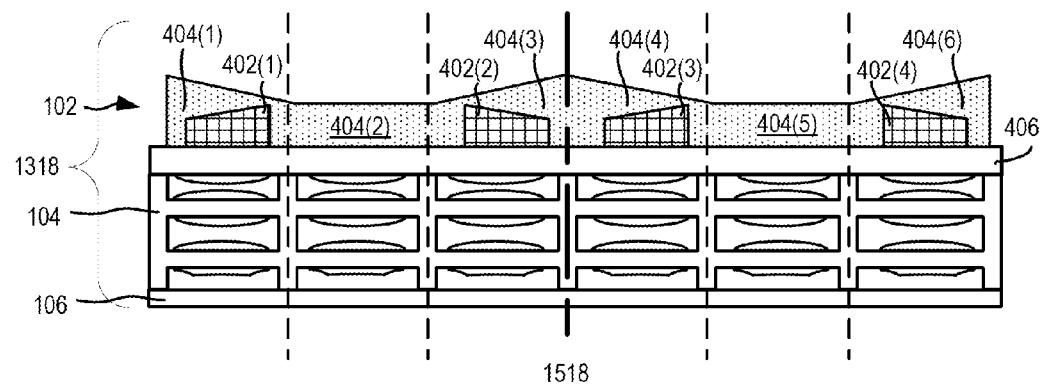
Figure 15C:
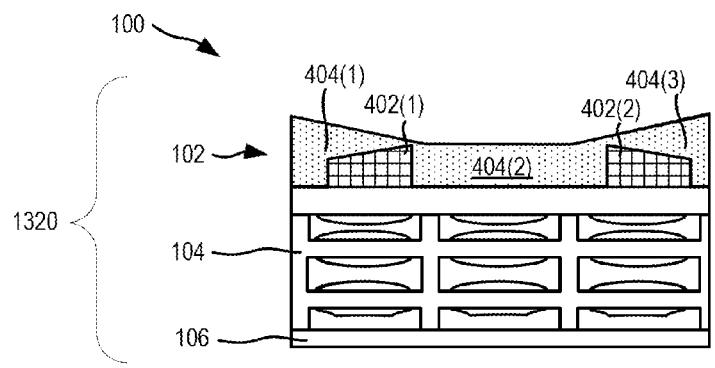

FIG. 13 is a flowchart illustrating one exemplary method 1300 for fabricating a wide-angle camera with an achromatic doublet prism array. FIG. 14 depicts a perspective view of camera 100 of FIG. 1, including achromatic doublet prism array 102 stacked on lens array 104 and imaging sensor array 106, which is illustratively shown formed on an imaging substrate 1408, in one embodiment. FIGS. 15A-C are a cross sectional schematic diagrams illustrating the steps of method 1300, of FIG. 13 to form a plurality of cameras 100 on a wafer. In particular, FIG. 15A shows exemplary use of molds 1500, 1508 to form first and second prisms onto a substrate 1506, and FIG. 15B shows substrate 1506 combined with a lens array assembly 1514 and an image sensor array 1516 that is then diced to form each individual camera assembly 1400. FIGS. 13 through 15B are best viewed together with the following description.

For the purposes of discussion of FIGS. 13-15B, reference is made to manufacturing three-by-three array camera assemblies 1400. However, it should be appreciated that method 1300 may apply to any N×M camera assembly array, where N and M are positive integer values.

In step 1302, method 1300 generates a first mold corresponding to an array of first prisms. In one example of step 1302, first mold 1500 is generated for forming an array of first prisms 402. First mold 1500 is configured with a plurality of areas 1502 corresponding to the desired formation of first prisms 402. In FIG. 15A, mold 1500 is shown forming two achromatic doublet prism arrays 1402 that each correspond to cross section line B-B of FIG. 14. Moreover, as each area 1502 correlates to a given section of the achromatic double prism, each area 1502 may have a different formation based on a desired formation of the first prism in that section. In the example illustrated in FIG. 15, the cross section of first mold 1500 correlates to first prisms 402 of achromatic doublet prisms 202(2), 202(5) and 202(8) of achromatic doublet prism array 102 of FIGS. 1 and 14, where area 1502 is shaped and sized to form each first prism 402 therein.

In step 1304, method 1300 forms, using the first mold, an array of first prisms, composed of a first material, onto a first substrate. In one example of step 1304, first material is disposed into areas 1502(1)-(4) to form first prisms 404(1)-(4), respectively, on substrate 406. First material may be ultra-violet (UV) curable material. Substrate 406 may be glass, plastic, silicon, or other optically transparent material.

In optional step 1306, first material is cured to finalize formation of first prisms 1504.

In step 1308, method 1300 removes the first mold. In one example of step 1308, first mold 1500 is removed leaving first prisms 402 on substrate 406.

In optional step 1310, method 1300 generates a second mold corresponding to an array of second prisms. In one example of step 1310, second mold 1508 is generated for forming an array of second prisms 404. Mold 1508 includes at least one area 1510 corresponding to the desired formation of second prisms 404. Mold 1508 corresponds to mold 1500 and forms a plurality of cameras 100 on a wafer for example. Each section of area 1510 correlates to a given section of the achromatic double prism array 102, wherein each section of area 1510 may have a different shape and size based upon the shape and size or a corresponding second prism 404 of achromatic prism array 102. In the example illustrated in FIG. 15A, the cross section of mold 1510 correlates to sub-cameras 306(2), 306(5) and 306(8) of camera 100 of FIGS. 1, 2 and 3, including an area 1510 for forming second prism 404 therein. Were cross section line B-B to cross through sections 202(1)-202(3), for example, the surface of mold 1510 would differ to match the desired formation of second prisms 404 of those sub-cameras 306.

In step 1312, method 1300 forms, using the second mold, an array of second prisms, composed of a second material different from the first material, onto the first prisms. In one example of step 1312, second material is disposed into area 1510 to form second prisms 404(1)-(6), respectively, on first prisms 402. In the example shown in FIG. 15A, which applies to a 3×3 array, the center of the array corresponding to sub-camera 306(5) only includes second material and no first prism. Therefore, at this section, second material is formed onto substrate 406. Second material may be a ultra-violet (UV) curable material.

In optional step 1314, second material is cured to finalize formation of second prisms 404.

In step 1316, method 1300 removes the second mold. In one example of step 1316, second mold 1508 is removed leaving second prisms 404 above first prisms 402 and substrate 406.

In optional step 1318, method 1300 stacks first and second prism arrays formed in steps 1302-1316 on a lens array assembly. In one example of step 1318, substrate 406, having first prisms 402 and second prisms 404 located thereon is stacked onto lens array assembly 104 and image sensor array 106. In the example of FIG. 15B, an additional lens (e.g., lens 408. FIG. 4) has been formed onto a second side of substrate 406 prior to stacking.

In optional step 1320, method 1300 dices the stacked array to form individual cameras. In one example of step 1320, achromatic prism array 102, substrate 406, lens array 104, and image sensor array 106 are diced (e.g., along dicing line 1518) to form individual cameras 100, as shown in FIG. 15C.

Steps 1301 and 1317 are optional. If step 1301 is included, then step 1317 is not included. If step 1317 is included, then step 1301 is not included. In each of optional steps 1301 and 1317, an optional lens array is fabricated on a second side of the substrate. In one example of steps 1301 and 1317, lenses 408 are fabricated onto a second side of substrate 406. That is, if included, lenses 408 may be fabricated onto a second side of substrate 406 either before or after fabrication of achromatic doublet prism array 102.

Figure 16:
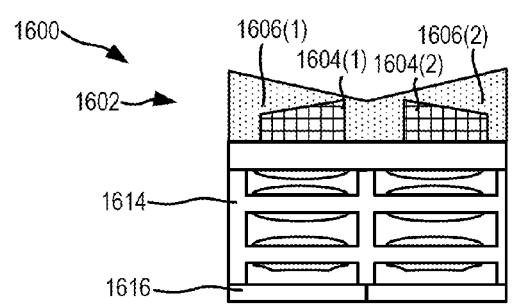
FIG. 16 is a cross sectional schematic diagram illustrating one exemplary camera with a 2×2 achromatic doublet prism array formed by the method of FIG. 13.

In the examples of FIGS. 1 through 15, because sub-camera 306(5) requires no modification of its corresponding field of view, no first prism 402 is included. In other words, assuming camera 100 if formed of a symmetrical N×N array of sub-cameras 306, when N is odd, the center achromatic doublet prism of the achromatic doublet prism array 102 may not include first prism 402, but may include material corresponding to other second prisms 404. When N is even, the center sub-cameras optionally include a first prism. For example, in a 4×4 array, the center four sub-cameras of camera 100 may only include the second material. Alternatively, in a 4×4 array, the center four sections may include both a first and second prism. FIG. 16 is a cross sectional schematic diagram illustrating one exemplary camera 1600 with a 2×2 achromatic doublet prism array 1602 formed by method 1300 of FIG. 13. Camera 1600 has an achromatic doublet prism array 1602, a lens array 1614, and a sensor array 1616. In the example of FIG. 16, camera 1600 is formed as a 2×2 array of sub-cameras, and therefore has no central sub-camera, wherein each sub-camera includes both a first and second prism 1604, 1606.

As illustrated in FIGS. 15A-C, second material forming second prisms 404 may be made from a single contiguous layer of material that encapsulates each of first prisms 402. Advantageously, this saves time and precision of aligning second prisms 404 with first prisms 402. Alternatively, second mold 1508 may be configured such that only a top surface of first prisms 402 is covered with second material of the respective second prisms 404, in a similar manner to FIGS. 3 and 4. Advantageously, this saves money on the amount of material used in forming second the prism array.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A wide-angle camera, comprising:
   a sensor having a plurality of pixel sub-arrays;
   an array of optical elements mounted to a first side of a substrate, each of the optical elements being capable of forming an image of a field of view onto a different one of the pixel sub-arrays; and
   an array of achromatic doublet prisms mounted to a second side of the substrate, each of the achromatic doublet prisms being aligned to provide a viewing angle with a different one of the optical elements;
   wherein each achromatic doublet prism of the array of achromatic doublet prisms is aligned to provide a viewing angle with a different optical element of the array of optical elements, such that the sensor captures a wide-angle field of view while having a compact format.

2. The wide-angle camera of claim 1, each of the achromatic doublet prisms comprising:
   a first prism formed of a first material on the second side of the substrate; and
   a second prism formed of a second material on a surface of the first prism, the first and second prisms defining a combination surface therebetween.

3. The wide-angle camera of claim 2, the first prism having a first Abbe number that is lower than a second Abbe number of the second prism.

4. The wide-angle camera of claim 2, the first material having a first refractive index that is higher than a second refractive index of the second material at a given wavelength.

5. The wide-angle camera of claim 1, wherein geometry of each of the achromatic doublet prisms depends upon its position within the array of achromatic doublet prisms.

6. In a compact format wide-angle camera of the type having an array of optical elements and a corresponding array of single prisms cooperating to capture a wide field-of-view, wherein said array of optical elements is formed on a first side of a substrate and said array of single prisms is formed on a second side of said substrate, and wherein each of said single prisms is aligned with a different one of the optical elements and causes chromatic aberration, the improvement comprising:
   implementing the array of single prisms as an array of achromatic doublet prisms formed using wafer-level fabrication onto the second side of the substrate such that each achromatic doublet prism is aligned with a different one of the optical elements, said array of achromatic doublet prisms and the array of optical elements cooperating to capture the wide field-of-view with reduced chromatic aberration.

7. The wide-angle camera of claim 2, the second material being the same contiguous material between each of the achromatic doublet prisms.

8. The wide-angle camera of claim 2, further comprising an area located in the center of the array of achromatic doublet prisms including only the second material.

9. The wide-angle camera of claim 1, wherein each of the achromatic doublet prisms is directly adjacent to at least one other of the achromatic doublet prisms.

* * * * *